United States Patent [19]

Gavagan

[11] Patent Number: 4,828,314

[45] Date of Patent: * May 9, 1989

[54] VISOR WITH RETRACTABLE GLARE SHIELDS

[75] Inventor: James A. Gavagan, Centerline, Mich.

[73] Assignee: Irvin Industries, Inc., Rochester Hills, Mich.

[*] Notice: The portion of the term of this patent subsequent to Mar. 1, 2005 has been disclaimed.

[21] Appl. No.: 152,409

[22] Filed: Feb. 4, 1988

Related U.S. Application Data

[63] Continuation of Ser. No. 32,312, Mar. 30, 1987, Pat. No. 4,728,142.

[51] Int. Cl.$^4$ ................................................. B60J 3/02
[52] U.S. Cl. ............................... 296/97.8; 160/DIG. 3
[58] Field of Search ................. 296/97 G, 97 H, 97 R; 160/DIG. 3

[56] References Cited

U.S. PATENT DOCUMENTS

| | | | |
|---|---|---|---|
| 2,134,414 | 10/1938 | Norcross | 296/97 G |
| 2,733,763 | 2/1956 | Nygaard | 296/97 G |
| 3,208,792 | 9/1965 | Martin | 296/97 G |
| 3,410,602 | 11/1968 | Schuler | 296/97 G |
| 3,853,370 | 12/1974 | Barnhart | 296/97 G |
| 4,264,100 | 4/1981 | Keeler, II | 362/142 |
| 4,323,275 | 4/1982 | Lutz | 296/97 G |
| 4,486,819 | 12/1984 | Marcus et al. | 362/142 |

Primary Examiner—Robert R. Song
Attorney, Agent, or Firm—Harness, Dickey & Pierce

[57] ABSTRACT

An improved visor assembly for motor vehicles is disclosed which includes one or more retractable glare screens which are integrated with the visor structure such that they can be extended and retracted from the visor as needed. The glare screens are preferably made from a transparent tinted material which reduces the intensity of bright lights or glare which the driver may be exposed to. The glare screens are guided for retracting movement through using slot followers which travel in elongated guide slots formed by the visor center board member. Clearance slots are formed along the perimeter edge of the visor by using elongated reinforcement members. The visor according to this invention can be produced economically and enables the glare screens to be extended and retracted without binding.

8 Claims, 2 Drawing Sheets

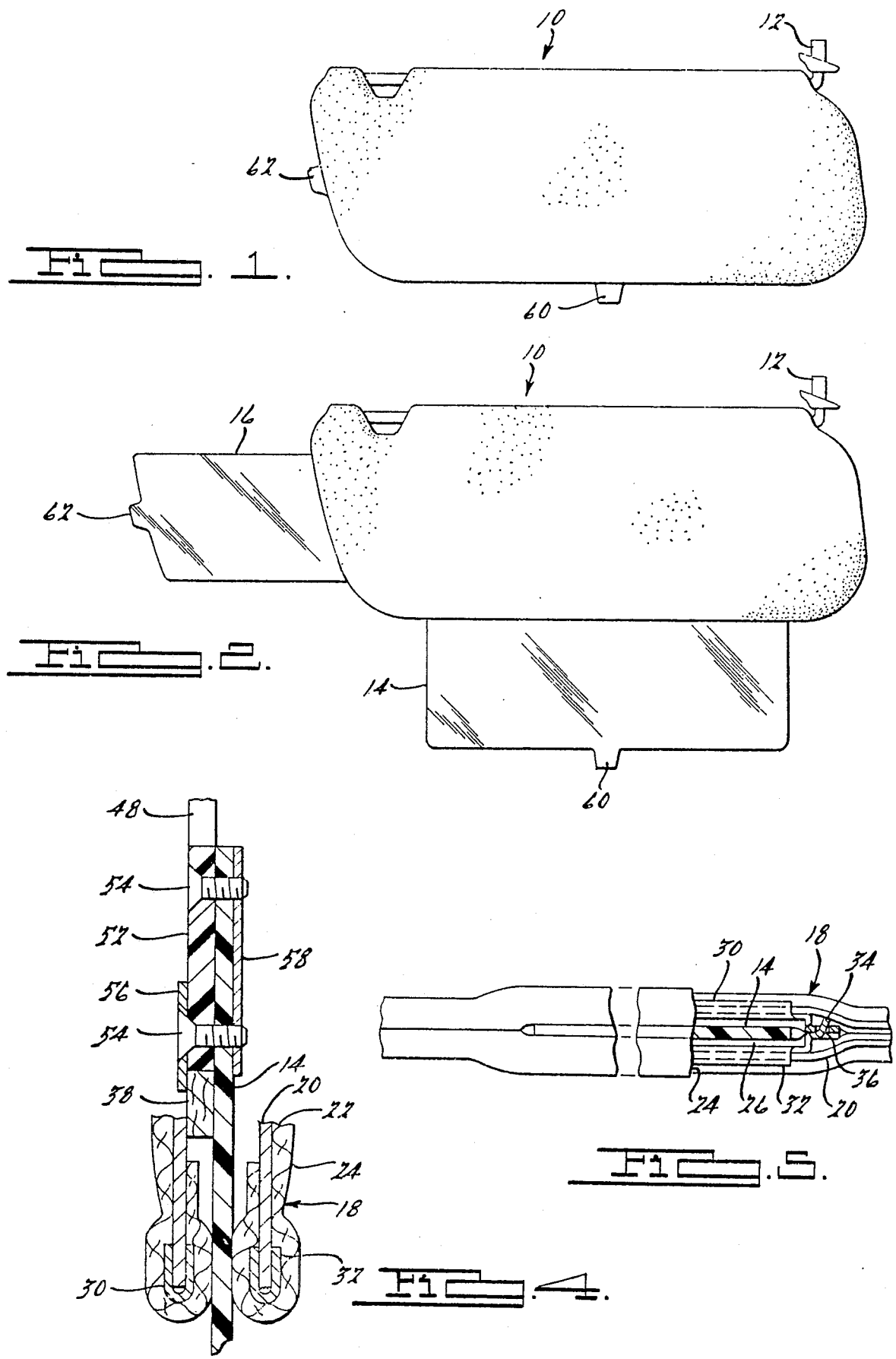

VISOR WITH RETRACTABLE GLARE SHIELDS

This is a continuation of U.S. patent application Ser. No. 32,312, filed Mar. 30, 1987 entitled "Visor with retractable glare shields", now abandoned.

BACKGROUND AND SUMMARY OF THE INVENTION

This invention relates to a sun visor assembly and particularly to one equipped with multiple retractable glare screens.

Motor vehicles have been equipped with sun visors since the early days of motor transportation. Sun visors are typically connected to the windshield header of the vehicle by an articulated joint which permits the visor to be positioned to shade the vehicle occupant from the direct rays of the sun or other light sources. Sun visors not only increase the comfort and convenience of driving in bright sunlight and at night, but also are considered safety items since glare can interfere with the driver's vision of traffic and road hazards. Although visors generally perform adequately, in certain driving conditions, it is desirable to provide a tinted transparent shield which the driver can see through while reducing the intensity of bright glare. Such devices are particularly useful in night driving conditions when headlights of oncoming cars are directed at the driver. Several designs of modified sun visors are presently known having internally retained retractable glare screens. Other devices according to the prior art disclose glare screen assemblies which attach to existing sun visors which can be retracted and adjusted to suit the particular conditions.

Although sun visors with retractable glare screens are presently known, there is a need to provide such a device which is less complex in design and more economically produced than present designs. Further, it is desirable to provide such a visor which enables the auxiliary glare screens to be retracted and extended without binding. Since an auxiliary glare screen device is preferably transparent and would advantageously be made of a polymeric plastic material, it is desirable to insure that such glare screens will not become scratched or abraded as they are extended and retracted which could impair their transparency and degrade their appearance. The visor with auxiliary glare screens according to this invention provides the above-mentioned desirable features, thereby improving over such devices known to the prior art.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 1 is a rear elevational view of a visor with retractable lower and side auxiliary glare screens according to this invention showing the glare screens in their retracted positions;

FIG. 2 is a rear elevational view like FIG. 1 except showing the lower and side auxiliary glare screens in their extended positions;

FIG. 4 is a cross-sectional view taken along line 4—4 of FIG. 3 particularly showing the guide slot and slot follower which mounts the lower auxiliary glare screen; and FIG. 5 is a cross-sectional view taken along line 5—5 of FIG. 3 particularly showing the lower perimeter edge of the visor assembly.

DETAILED DESCRIPTION OF THE INVENTION

Figure 3:
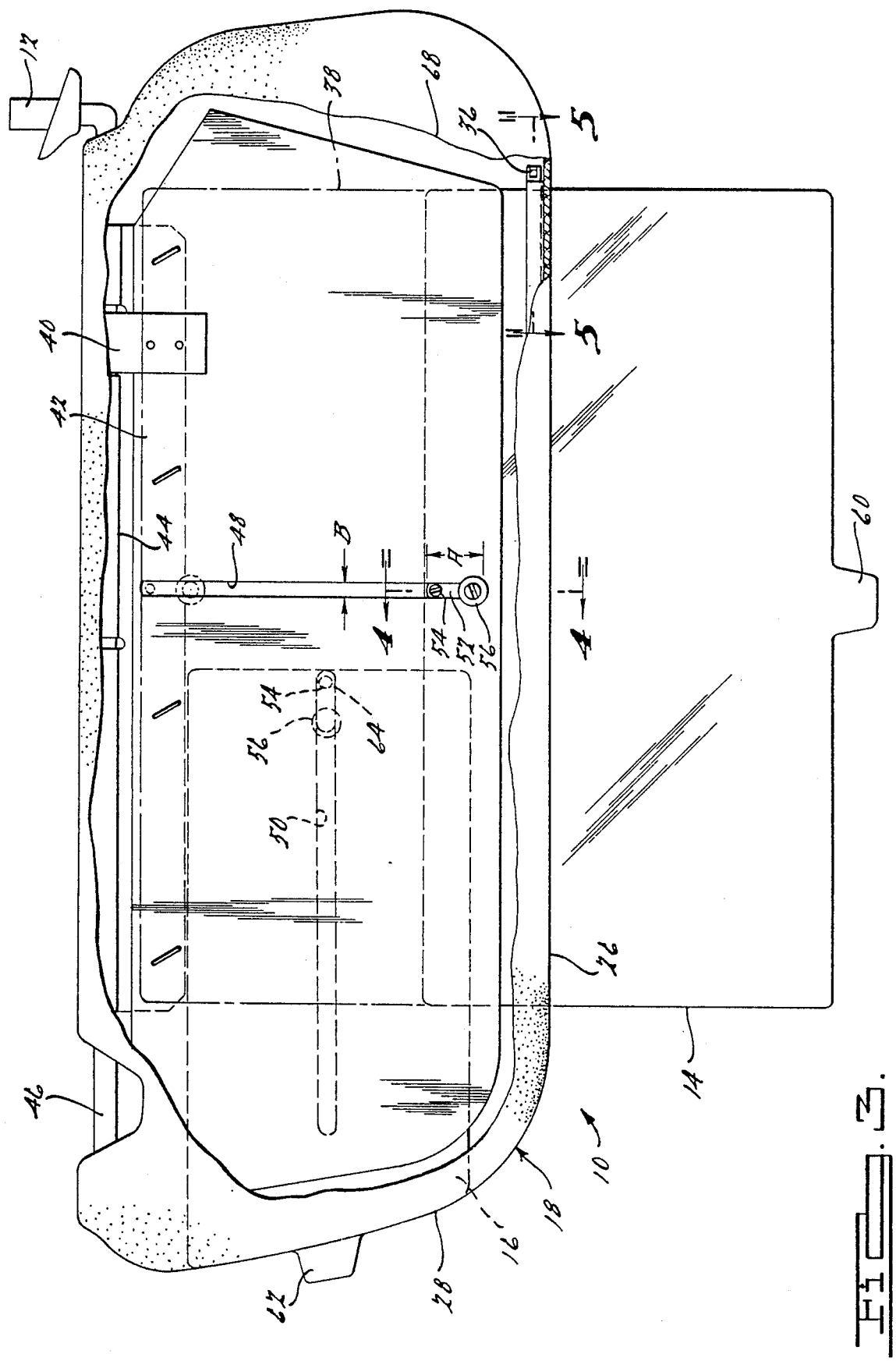
FIG. 3 is a rear view of the visor according to this invention with one leaf of the outer board removed, thereby showing the internal components and features of the visor in detail.

A visor with retractable glare screens is shown by the drawings of this specification and is generally designated by reference number 10. As shown in FIGS. 1 and 2, visor 10 is attached to a motor vehicle by visor arm 12 which enables the visor to be rotated about vertical and horizontal axes, thereby enabling the visor to be placed in a desired position. Visor 10 includes lower auxiliary glare screen 14 and side auxiliary glare screen 16. Glare screens 14 and 16 are shown in their retracted positions in FIG. 1 and in their extended positions in FIG. 2. In use, a driver or other vehicle occupant can extend either or both of glare screens 14 and 16 in order to reduce the intensity of annoying glare.

With specific reference to FIG. 3, the novel means according to this invention for supporting and guiding auxiliary glare screens 14 and 16 is described. Visor 10 includes outer board assembly 18 which is fabricated to form a pair of substantially identical leaves separated by a scored fold line. Outer board assembly 18 is folded over the internal components of the visor and its perimeter edges are secured together by sewing or bonding to complete fabrication of the article. FIG. 4 shows some of the details of outer board assembly 18. Typically, outer board assembly 18 would be comprised of a number of layers including outer board member 20, an intermediate layer of foam 22 or other cushion, and a covering layer of fabric material 24. The outer perimeter of outer board assembly 18 is locally separated to define a pair of clearance slots 26 and 28 enabling glare screens 14 and 16 to pass therethrough. Slot 26 is defined by edge reinforcement members 30 and 32, best shown in FIG. 5. Edge reinforcement members 30 and 32 are elongated and formed from sheet metal with rolled over edges which clamp the perimeter edge of outer board member 20. The ends of edge reinforcement members 30 and 32 are held together by deflecting tab 34 after it is passed through slot 36. Foam 22 and fabric 24 become rolled over edge reinforcement members 30 and 32 and are stitched or bonded in place as shown in FIG. 4. Slot 28 is formed using additional edge reinforcement members (not shown) which are identical to (except for length) members 30 and 32 described above.

Now with particular reference to FIG. 3, visor 10 includes center board 38 which is enclosed by outer board assembly 18. Detent clip 40 is attached to center board 38 and wraps around visor arm 12 to provide a desired level of torsional friction which enables the visor to remain at a desired rotated position. Reinforcement plate 42 is affixed to center board 38 by staples and defines upper rolled over edge 44 which encloses visor arm 12. Retention clip 46 is provided to engage with a clamp member (not shown) affixed to the motor vehicle header to securely retain the visor along the windshield header of the motor vehicle when desired. Retention clip 46 is preferably held in position by providing an integral post (not shown) which is inserted within rolled over edge 44 of reinforcement plate 42. Center board 38 defines a pair of guide slots 48 and 50 which are oriented perpendicular to each other. Guide slot 48 is positioned to intersect the center of clearance slot 26, whereas guide slot 50 intersects the center of clearance slot 28.

Slot follower 52 is attached to lower auxiliary glare screen 14 using threaded fasteners 54. One or more washers 56 are retained by fasteners 54 which thread into plate 58 to clamp glare screen 14. Washers 56 have an outside diameter substantially larger than the width of slot 48, thereby retaining slot follower 52 within the guide slot. Slot follower 52 is disposed within guide slot 48 and is designed to minimize the likelihood of binding of glare screen 14 when it is retracted and extended. This feature is provided by forming slot follower 52 such that its length along the centerline of guide slot 48 designated by dimension A is at least two and one-half times the width of the slot, designated by dimension B. It was found that this relationship provides the proper guiding effect and prevents glare screen 14 from becoming canted and binding while it is being extended or retracted. Glare screen 14 further defines pull tab 60 which enables convenient grasping of the screen when it is being retracted and extended. The positioning of pull tab 60 is preferably aligned with guide slot 48 such that forces on the pull tab will cause glare screen 14 to move without binding.

Side auxiliary glare screen 16 is constructed and retained in visor 10 like glare screen 14. Glare screen 16 includes pull tab 62 for convenient manipulation. Slot follower 64 is affixed to screen 16 using fasteners 54, washer 56 and threaded plate 66 in a manner identical with that described above. The previously described relationship between the length and width of slot follower 64 is also provided to avoid binding problems.

As shown in FIG. 3, glare screens 14 and 16 are disposed on opposite sides of center board 38 so that they will not interfere in their retracted positions. This positioning of glare screens 14 and 16 further reduces the likelihood of scratching or abrading of the glare screen which could result if they were able to contact each other. Glare screens 14 and 16 are loaded into position on center board 38 and fasteners 54 are threaded into plates 58 and 66 to retain washers 56 thereby preventing slot followers 52 and 64 from escaping from slots 48 and 50. In order to provide protection against scratching or abrading of the surfaces of glare screens 14 and 16, a thin plastic or fabric membrane 68 may be interposed between center board 38 and screens 14 or 16.

While the above description constitutes the preferred embodiments of the present invention, it will be appreciated that the invention is susceptible to modification, variation and change without departing from the proper scope and fair meaning of the accompanying claims.

What is claimed is:

1. A visor for a motor vehicle having one or more retractable auxiliary glare screens movable between a retracted position enclosed by said visor to an extended position, said visor of the type having a center board member which is enclosed by an outer broad member, said visor comprising:

means for defining a locally separated clearance slot along a segment of the perimeter edge of said outer board member for said auxiliary glare screen,
 said center boards defining an elongated guide slot aligned substantially with the center of said clearance slot,
 a slot follower affixed to said glare screen and traveling in said guide slot t guide said glare screen and to limit the range of motion of said glare screen, and
 a pull tab for moving said glare screen to said extended position formed by said auxiliary glare screen and projecting from said perimeter edge when said glare screen is in said retracted position, said pull tab aligned with said elongated guide slot.

2. The visor for a motor vehicle according to claim 1 comprising a lower auxiliary glare screen and a side auxiliary glare screen, said glare screens disposed on opposite sides of said center board, thereby preventing said glare screens from contacting each other in their retracted positions.

3. The visor for a motor vehicle according to claim 1 further comprising a membrane positioned between said auxiliary glare screen and said center board to prevent said glare from being abraded by said center board when moved between its extended and retracted positions.

4. The visor for a motor vehicle according to claim 1 wherein the length of said slot follower along the direction of extension of said guide slot is at least two and one-half times the width of said slot follower.

5. A visor for a motor vehicle comprising:

a retractable side auxiliary glare screen,
 a retractable lower auxiliary glare screen,
 a center board member which is enclosed by an outer board member,
 a first clearance slot along a first segment of the perimeter edge of said outer board member for said side auixliary glare screen, said center board member defining a first elongated guide slot aligned substantially with the center of said first clearance slot,
 a first slot follower affixed to said side auxiliary glare screen and disposed in said first guide slot, said first guide slot and said first slot follower guiding said side auxiliary glare screen and limiting the range of motion of aid side auxiliary glare screen,
 second means for defining a second clearance slot along a second segment of the perimeter edge of said outer board member for said lower auxiliary glare screen, said center board member defining a second elongated guide slow aligned substantially with the center of said second clearance slot, and
 a second slot follower affixed to said lower auxiliary glare screen and disposed in said second guide slot, said second guide slot and said second follower guiding said lower auixliary glare screen and limiting the range of motion of said lower auxiliary glare screen, said side and lower auixliary glare screens disposed on opposing sides of said center board member.

6. The visor for a motor vehicle according to claim 5 wherein the length of each of said slot followers along the direction of extension of each of said guide slots is at least two and one-half times the width of said slot followers.

7. The visor for a motor vehicle according to claim 5 further comprising a membrane positioned between at least one of said lower or side auxiliary glare screens and said center board member to prevent said at least one of said glare screens from being abraded by said outer board when moved between its extended and retracted positions.

8. A visor for a motor vehicle according to claim 5 further comprising a pull tab formed by at least one of said auxiliary glare screens for enabling said one of said auxiliary glare screens to be moved to its extended position, said pull tab extending from said clearance slot when associated with said one of said auxiliary glare screws said one of said auxiliary glare screens is in its retracted position, and said pull tab being aligned with said guide slot associated with said one of said auxiliary glare screws.

* * * * *

UNITED STATES PATENT AND TRADEMARK OFFICE
CERTIFICATE OF CORRECTION

PATENT NO. : 4,828,314
DATED : May 9, 1989
INVENTOR(S) : James A. Gavagan

It is certified that error appears in the above-identified patent and that said Letters Patent is hereby corrected as shown below:

Column 3, line 64, "broad" should be --board--.
Column 4, line 1, "boards" should be --board--.
Column 4, line 5, "t" should be --to--.
Column 4, line 21, insert "screen" after --glare--.
Column 4, line 36, "auixliary" should be --auxiliary--.
Column 4, line 44, "aid" should be --said--.
Column 4, line 49, "slow" should be --slot--.
Column 4, line 54, "auixliary" should be --auxiliary--.
Column 4, line 56, "auixliary" should be --auxiliary--.
Column 6, line 2, "screws" should be --screens--.
Column 6, line 5, "screws" should be --screens--.

Signed and Sealed this

First Day of December, 1992

*Attest:*

DOUGLAS B. COMER

*Attesting Officer*  Acting Commissioner of Patents and Trademarks